(12) United States Patent
Gray

(10) Patent No.: US 8,695,269 B1
(45) Date of Patent: Apr. 15, 2014

(54) FISHING ROD WITH LINE INDICATOR GRIP

(76) Inventor: David A. Gray, Lee's Summit, MO (US)

( * ) Notice: Subject to any disclaimer, the term of this patent is extended or adjusted under 35 U.S.C. 154(b) by 349 days.

(21) Appl. No.: 12/917,189

(22) Filed: Nov. 1, 2010

Related U.S. Application Data

(60) Provisional application No. 61/257,708, filed on Nov. 3, 2009.

(51) Int. Cl.
*A01K 87/00* (2006.01)
(52) U.S. Cl.
USPC .................................. 43/23; 43/18.1 R; 43/4
(58) Field of Classification Search
USPC ...................................... 43/18.1 R, 23, 25, 4

IPC ....................................................... A01K 87/00
See application file for complete search history.

(56) References Cited

U.S. PATENT DOCUMENTS

| | | | | | |
|---|---|---|---|---|---|
| 3,070,063 | A | * | 12/1962 | Lennon | 116/309 |
| 4,165,710 | A | * | 8/1979 | Gaetano | 116/223 |
| 4,203,565 | A | * | 5/1980 | Puryear | 242/318 |
| 5,568,787 | A | * | 10/1996 | Forslund | 116/307 |
| 5,924,639 | A | * | 7/1999 | Atherton | 242/322 |
| 6,003,263 | A | * | 12/1999 | Thurber et al. | 43/18.1 R |
| 6,564,495 | B1 | * | 5/2003 | Fehlig | 43/4.5 |

* cited by examiner

*Primary Examiner* — Darren W Ark
*Assistant Examiner* — Thien Thanh Pham

(57) ABSTRACT

A fishing rod handle with line type and strength indicator.

4 Claims, 4 Drawing Sheets

FISHING ROD WITH LINE INDICATOR GRIP

CROSS-REFERENCE TO RELATED APPLICATIONS

This application claims priority under 35 U.S.C. §119 to provisional application Ser. No. 61/257,708 filed Nov. 3, 2009, herein incorporated by reference in its entirety.

FIELD OF THE INVENTION

This invention relates to an improved and more efficient fishing rod.

BACKGROUND OF THE INVENTION

Since the commencement of recorded time, man has always enjoyed fishing, whether with the simplest pole and thread line to the more complicated bait casters, spinning rods and fly rods of today. As rods and reels become more complex, so too have fishing lines become more complex. In particular over the years they have progressed from natural thread-like woven fibers to synthetic lines, for example, monofilament. In modern times people often speak of three types of fishing lines in common use, monofilament, fluorocarbon and braided fishing line. These three lines also come in a variety of different weights, for example, for bait casting rods the line weight generally used include 8, 10, 12, 14, 15, 17, 20, 25, 30, 50 and 65. For spinning rods, the line weights commonly used are: 4, 6, 8, 10, 12, 14, 15, 20, 30 and 50. You can see that the mathematical combinations or variations that could exist using the variables of types of line, types of rods, and weight of line may increase in an exponential manner. And to further complicate issues, some lines are impossible to distinguish by mere inspection.

These phenomena, coupled with the fact that few serious fisherman rely on just a simple single pole set-up creates a problem of remembering line weight, and the line type, for any given pole. This can frustrate the fisherman that want to select carefully line weight and line type for fishing, whether it be for fresh water fish such as pan fish, walleyes, northern pike, bass or Muskie, or salt water fishing, such as for fish sea trout, sea bass, or tuna. there is no current aid available short of memory or writing in a notebook.

It can therefore be seen that there is a need for fisherman's tool/indicator that allows a fisherman to instantly know the line weight and line type on a rod or reel. This invention has as its primary objective the fulfilling of this need.

BRIEF SUMMARY OF THE INVENTION

This invention relates to an improved fishing rod having a rod portion and a handle portion with the handle portion having an adjustable indicator for indicating line type and line weight of fishing line that happen to be associated with any particular rod and reel.

DETAILED DESCRIPTION OF THE PREFERRED EMBODIMENT

Figure 1:
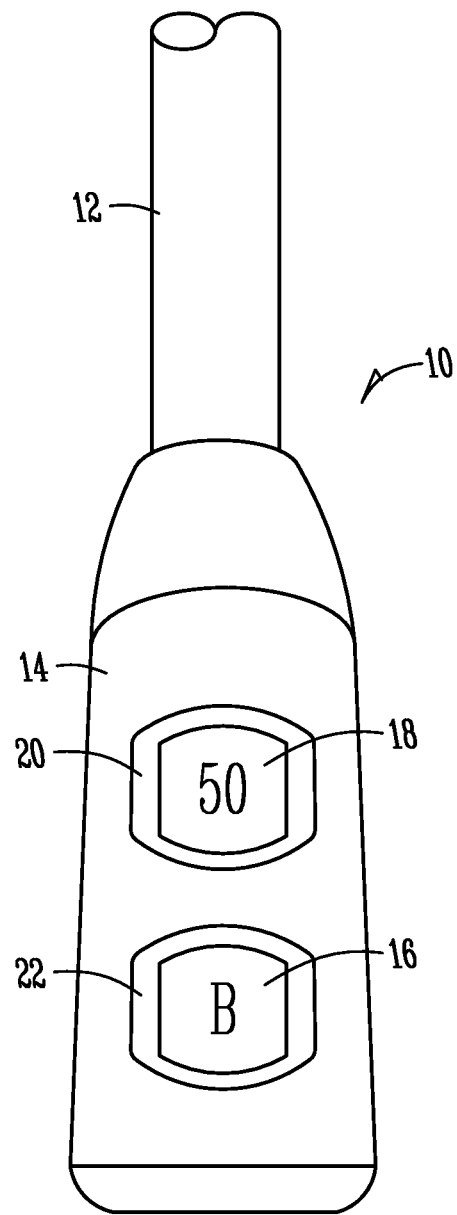
FIG. 1 is a perspective view of a rod handle showing two viewing windows, one for line weight and one for line type, with the windows allowing viewing of adjustable dial wheels have indicia thereon.

Referring to FIGS. 1-4 of the present invention, fishing rod 10 has a rod portion 12 and a handle portion 14. The rod portion 12 is of conventional materials, as is the handle portion 14. However, built into the handle portion 14 are adjustable indicators 16 and 18 which indicate the line type 16 and the light weight 18. Particularly, the adjustable indicators 16 and 18 are comprised of a pair of spring loaded locking wheel indicators that turn about an axis to allow variable adjustment of line number and line weight in the windows 20, 22 so they correspond to the line used on the rod and reel.

Various mechanical mechanisms for the adjustable indicators 16 and 18 can be employed. While we have mentioned herein loaded locking wheel dials, they could also be, for example, friction detent locking wheels. The specific type of rotatable dial indicator and the mechanism to allow rotation and releasable locking are well within the ordinary skill of the art.

The windows 20 and 22 as depicted in the drawing FIGS. 1-4 are shown to be two in number, but they can be both visible in a single window, as this is a non-limiting feature of the invention.

Figure 2:
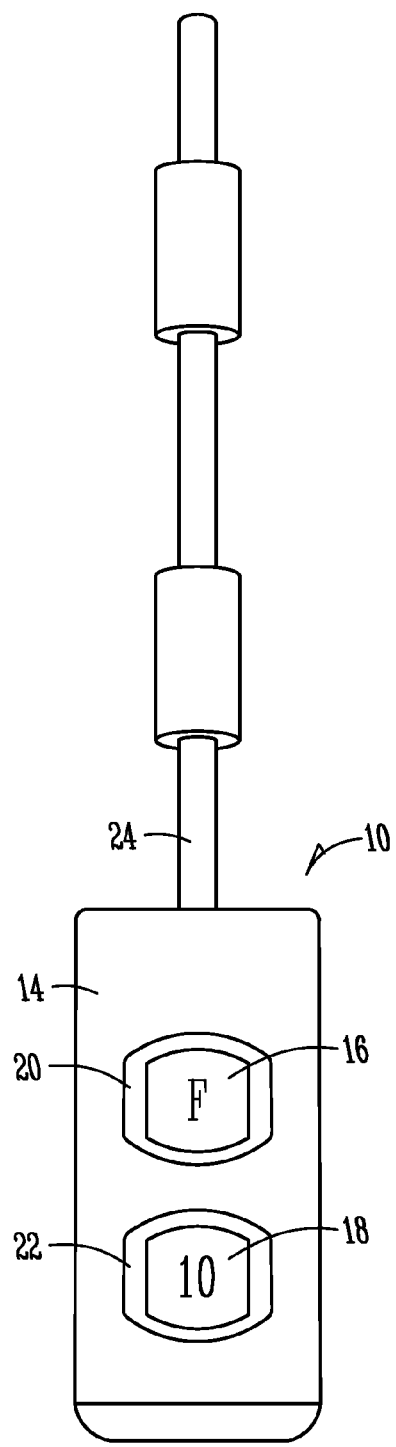
FIG. 2 is a view of dial wheels which may be imbedded into the handle of a fishing rod and showing the rod insert aspect of the invention.
Figure 3:
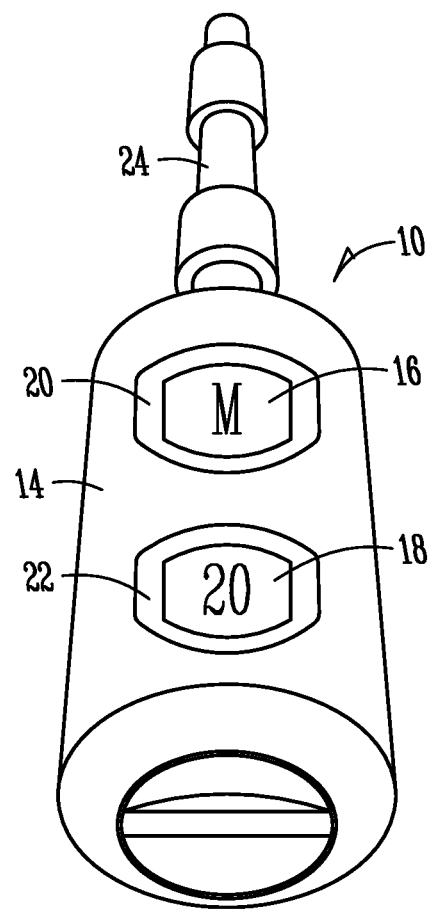
FIG. 3 is a close-up view of the wheel indicia and the butt cap of a handle portion of one of the rods.

As perhaps best seen in FIG. 2, if desired the handle portion 14 can have a mounting rod 24 for insertion into the fishing rod 10 to increase the fishing rod strength in the handle area 14.

Figure 4:
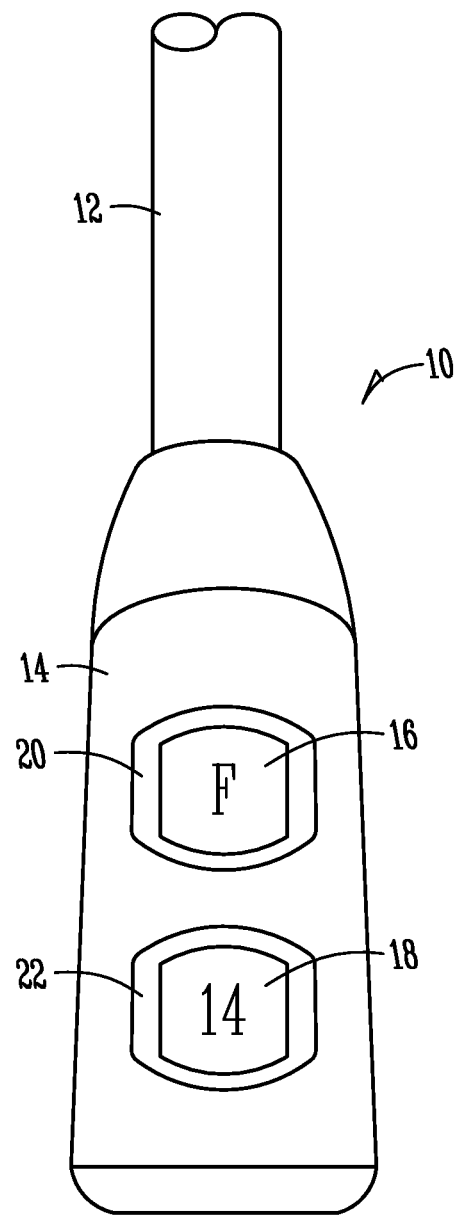
FIG. 4 is a view of another rod handle, cork-type variety having a built-in wheel indicia in the handle.

Handle portion or grips 14 can be finished of a variety of materials. They may be cork, as depicted in FIG. 4, or made of other composite materials that have a soft touch and feel which enhance the visual look and appeal, and also perform a function of a non-slippery surface to improve grip.

It goes without saying that variations on the indicator mechanisms in the handle of the fishing rod 10 may be made. For example, the majority of the description herein shows wheel indicators 16 and 18 on exterior surface of the handle portion 14. It could, however, be knobs on the butt 24 of rod so there are alternate indicators for the same purpose that can be used. The important part being that for the first time a rod has a line weight and line type indicator. As illustrated, the line type is indicated by F for fluorocarbon, M for monofilament, and B for braided. It is contemplated that such minor revisions as they are within the spirit and scope of the invention as described herein.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A fishing rod for allowing the fisherman to instantly know the characteristics of a fishing line being used with the fishing rod, wherein said fishing rod comprises:
   a rod portion and a handle portion;
      said handle portion having two adjustable dial indicators, one of said two dial indicators for indicating a line type and the other of said two dial indicators for indicating a line weight,
      wherein the line type is indicated by a plurality of letters on the one of said two dial indicators, each of the letters representing a name of a material of the fishing line being used on the rod portion and the line weight is indicated by a plurality of numbers on the other of said two dial indicators, each of the numbers representing a different line weight; wherein each of the adjustable dial indicators is both imbedded in the handle portion and viewable through a separate window in the handle portion.

2. The fishing rod of claim 1 wherein the adjustable indicators are spring-loaded locking wheel dial indicators.

3. The fishing rod of claim 1 wherein the adjustable indicators are friction detent locking wheel dial indicators.

4. The fishing rod of claim 1 wherein the handle portion has a mounting rod for inserting into the fishing rod to increase the fishing rod strength in the handle area.

\* \* \* \* \*